United States Patent
Soehner et al.

(10) Patent No.: US 10,857,665 B2
(45) Date of Patent: Dec. 8, 2020

(54) MOBILE MANUFACTURING MODULE

(71) Applicant: Airbus Operations GmbH, Hamburg (DE)

(72) Inventors: Gaby Soehner, Hamburg (DE); Ingo Krohne, Hamburg (DE); Robert Alexander Goehlich, Hamburg (DE); Mihaela Colceriu, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 103 days.

(21) Appl. No.: 16/192,970

(22) Filed: Nov. 16, 2018

(65) Prior Publication Data

US 2019/0176322 A1 Jun. 13, 2019

(30) Foreign Application Priority Data

Nov. 22, 2017 (GB) .................................. 1719419.2

(51) Int. Cl.
| | | |
|---|---|---|
| B23Q 3/00 | (2006.01) | |
| B25J 9/00 | (2006.01) | |
| B23P 19/04 | (2006.01) | |
| B23Q 37/00 | (2006.01) | |
| B25J 9/08 | (2006.01) | |
| B25J 5/00 | (2006.01) | |

(52) U.S. Cl.
CPC ............. *B25J 9/0009* (2013.01); *B23P 19/04* (2013.01); *B23Q 37/00* (2013.01); *B25J 5/007* (2013.01); *B25J 9/0084* (2013.01); *B25J 9/0087* (2013.01); *B25J 9/08* (2013.01); *B23P 2700/01* (2013.01)

(58) Field of Classification Search
CPC ... B23Q 3/00; B23Q 3/06; B23Q 3/10; B23Q 3/154; B23Q 15/00; B23Q 16/00
See application file for complete search history.

(56) References Cited

U.S. PATENT DOCUMENTS

| | | | | |
|---|---|---|---|---|
| 6,921,317 | B2 * | 7/2005 | Wood ...................... | B24B 19/06 451/1 |
| 8,231,117 | B2 * | 7/2012 | Nishikawa ............... | B23K 9/02 269/55 |
| 9,327,408 | B2 * | 5/2016 | Naitou ..................... | B25J 19/06 |
| 2011/0140332 | A1 * | 6/2011 | Li ....................... | G01R 31/2887 269/74 |
| 2013/0086801 | A1 * | 4/2013 | Mimura .................. | B23P 21/00 29/720 |
| 2014/0277713 | A1 * | 9/2014 | Kouno ................... | B25J 9/0084 700/248 |
| 2019/0176322 | A1 * | 6/2019 | Soehner ................. | B23P 19/04 |

\* cited by examiner

*Primary Examiner* — Lee D Wilson
(74) *Attorney, Agent, or Firm* — Greer, Burns & Crain, Ltd.

(57) ABSTRACT

A mobile manufacturing module comprising a platform configured to receive and support one or more interchangeable manufacturing elements and engageable with a removable positioning device that when engaged is configured to enable movement of the platform relative to a work piece, and one or more supports connected to the platform that are configured to contact a floor in order to support the platform when the removable positioning device is disengaged.

13 Claims, 7 Drawing Sheets

MOBILE MANUFACTURING MODULE

CROSS-REFERENCES TO RELATED APPLICATIONS

This application claims the benefit of the Great Britain patent application No. 1719419.2 filed on Nov. 22, 2017, the entire disclosures of which are incorporated herein by way of reference.

FIELD OF TECHNOLOGY

The present technology relates to a mobile manufacturing module.

BACKGROUND OF THE INVENTION

Nowadays, the use of mobile manufacturing manipulators to carry out one or more manufacturing operations is well established, particularly for use during assembly and maintenance of a work piece.

Prior art mobile manufacturing manipulators, for example the Neobotix MMO-700 shown as item 101 of FIG. 1, generally consist of a manipulator arm 103 with a base 105 that is mounted to a mobile platform 107. The platform 107 is configured to support the manipulator arm 103 and is fixedly attached to a platform chassis 109 that comprises a set of 4 wheels 111, each omnidirectional and driven via an onboard drivetrain 113 comprising set of interconnected motors, transmissions and a power-pack attached to the platform chassis 109, such that movement of the mobile manufacturing manipulator 101 to a desired lateral position in an XY floor plane is permitted. The platform 107 is also provided with braking means, which is provided by the drivetrain that is configured to restrain the mobile manufacturing manipulator 101 from moving away from a desired lateral position when the breaking means are applied.

When in use, each mobile manufacturing manipulator 101 is positioned into a lateral and vertical position desired by a technician, such that the manipulator 101 is moved to a coarse position relative to a work piece 115, after which the braking means are applied. The technician then instructs the manipulator 101, with the relevant work attachment 117 or other robot, to execute a desired manufacturing operation to a high degree of positional accuracy relative to the work piece 115. Examples of such a manufacturing operation would be a drilling operation or a surface treatment operation.

In some manufacturing lines, the size, irregularity of shape, position or construction characteristics of the work piece(s) requires multiple mobile manufacturing manipulators to be operated by one or more technicians. Provision of multiple mobile manufacturing manipulators is not desirable as they are relatively expensive tooling items, primarily due to their complex and heavy design that integrates a manipulator with a platform, platform chassis, drivetrain and braking means into a single device. It is also undesirable because one or more technicians is required to manage the positioning, selection and operation of each mobile manufacturing manipulator, which impacts the associated operational costs for the manufacturing line. Depending on the number of technicians, it may also increase the overall manufacturing time for a given work piece, which may affect the overall cost of the operation significantly. This is common in aircraft manufacture. Furthermore, provision of multiple mobile manufacturing manipulators to approximately the same work piece position may be desirable to carry out a series of manufacturing operations that requires interdependency between pluralities of manipulators. This may not only be possible due to the aforementioned tooling and technician costs, but also because the movement of multiple mobile manufacturing manipulators to a single area may also be limited by the floor load limits of the work areas.

SUMMARY OF THE INVENTION

It is an object of the present technology to provide a mobile manufacturing manipulator arrangement which overcomes the disadvantages of the state of the art so far described.

An embodiment of the present technology provides a mobile manufacturing module comprising a platform configured to receive and support one or more interchangeable manufacturing elements and engageable with a removable positioning device that when engaged is configured to enable movement of the platform relative to a work piece, and one or more supports connected to the platform that are configured to contact a floor in order to support the platform when the removable positioning device is disengaged.

A further embodiment of the present technology provides mobile manufacturing module wherein the removable positioning device is further configured to generate traction forces such that the module can be driven by the removable positioning device.

Yet a further embodiment of the present technology provides a mobile manufacturing platform wherein the removable positioning device comprises lifting means configured to engage the platform and to lift the platform such that contact between the floor and the one or more supports is removed.

Another embodiment of the present technology provides a mobile manufacturing module wherein at least one of the manufacturing elements comprises a robotic manipulator.

A further embodiment of the present technology provides a mobile manufacturing module wherein at least one of the manufacturing elements comprises a container.

In another embodiment mobile manufacturing module is provided wherein at least one of the manufacturing elements comprises a lifting unit.

In yet another embodiment a mobile manufacturing module is provided wherein at least one of the manufacturing elements comprises a control console.

A further embodiment of the present technology provides a mobile manufacturing module wherein at least one of the manufacturing elements comprises an electrical power distributor.

Another embodiment of the present technology provides a plurality of mobile manufacturing modules further comprising one or more connectors configured to connect a plurality of mobile manufacturing modules to one another and further configured to transfer traction forces between the plurality of modules such that they may move as a single modular assembly when each mobile manufacturing module is simultaneously engaged with a removable positioning device.

The plurality of mobile manufacturing modules may further comprise one or more connectors configured to transfer lift forces between a plurality of mobile manufacturing modules.

The plurality of mobile manufacturing modules may comprise a pair of mobile manufacturing modules, each engageable to a corresponding removable positioning device and each connected by one or more connectors to one or more adjacent mobile manufacturing modules, wherein each adjacent mobile manufacturing modules does not contact the floor when the pair of mobile manufacturing modules engaged to their corresponding removable positioning devices.

A further embodiment of the present technology provides a plurality of mobile manufacturing modules comprising at least two mobile manufacturing modules, each comprising a robotic manipulator configured to work in tandem to carry out a series of manufacturing operations.

Another embodiment of the present technology provides a mobile manufacturing module configured for use on an aircraft manufacturing line. The plurality of mobile manufacturing modules may be configured for use on an aircraft manufacturing line.

BRIEF DESCRIPTION OF THE DRAWINGS

Embodiments of the technology will now be described, by way of example only, with reference to the following figures in which.

DETAILED DESCRIPTION OF THE PREFERRED EMBODIMENTS

Figure 1:
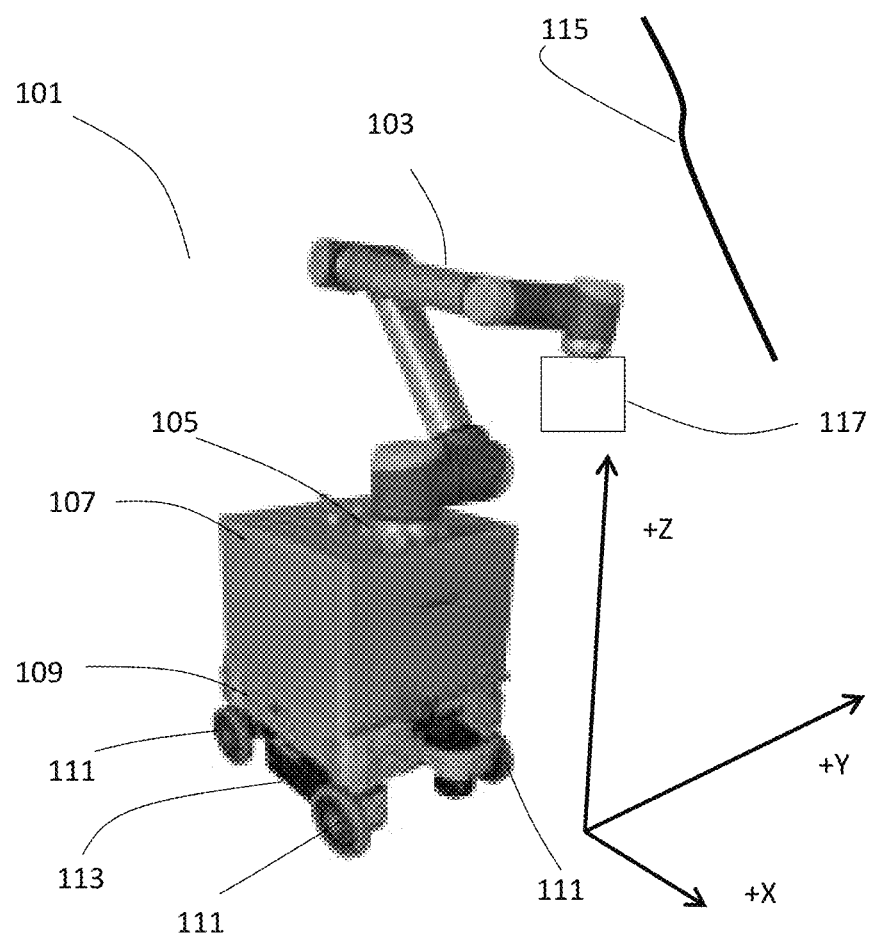
FIG. 1 shows a prior art mobile manipulator available from Neobotix GmbH http://www.neobotix-robots.com/mobile-manipulator-mmo-700.html
Figure 2:
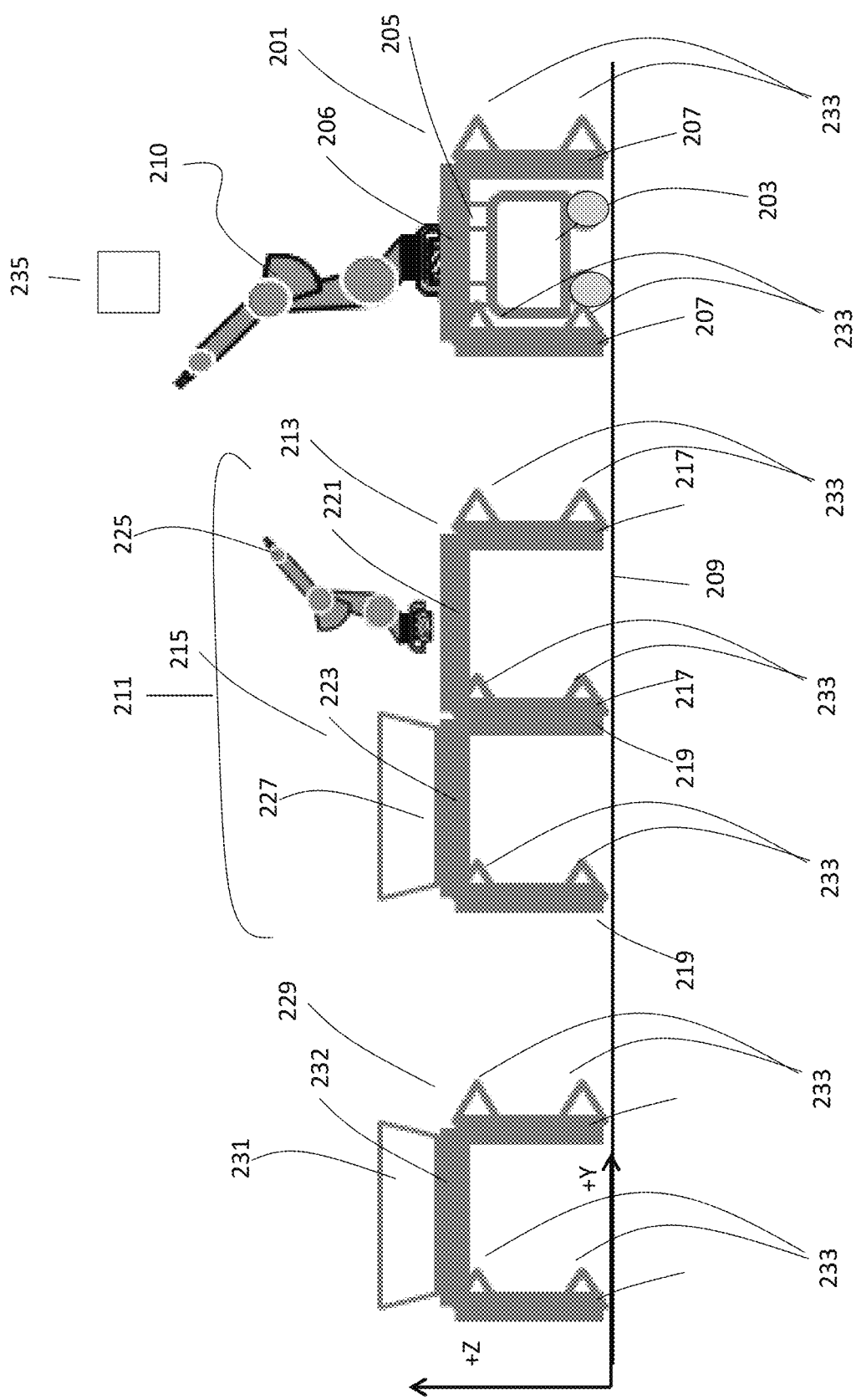
FIG. 2 shows a schematic view mobile manufacturing module and a plurality of mobile manufacturing modules according to an embodiment of the present technology.

With reference to FIG. 2, a first mobile manufacturing module 201 is shown engaged with a removable positioning device 203. The removable positioning device 203 is provided with a lifting means 205 configured to engage an underside portion of a platform 206 and lift the platform 206 such that contact of the supports 207 with the floor 209 is removed and therefore allow the module 201 to be moved. Alternatively, the lengths of the supports 207 may be adjustable such that contact can be removed once the platform 206 is lifted sufficiently to remove load from supports 207 when the removable positioning device 203 is engaged. Similarly, once the module is in a desired position, the lifting means 205 can lower the platform 206 such that contact of the supports 207 with the floor 209 is re-established and the removable positioning device 203 can be disengaged for use in repositioning other modules. This increases the usability of the modules and reduces their complexity and therefore costs. The first mobile manufacturing module 201 also comprises a platform 206 configured to receive an interchangeable manufacturing element, which for the first module 201 is in the form of a robotic manipulator 210 attached to the platform 206.

Also shown is plurality of mobile manufacturing modules 211 comprising a second mobile manufacturing module 213 connected to a third mobile manufacturing module 215. Both the second and third mobile manufacturing modules 213 215 are shown disengaged from a removable positioning device and such that their supports 217 219 supports contact the floor and to support their platforms 221 223, respectively.

The second mobile manufacturing module 213 comprises a manufacturing element in the form of a robotic manipulator 225 attached to the platform 221. The manipulator 225 is smaller than the manipulator 210 of the first mobile manufacturing module 201.

The third mobile manufacturing module 215 comprises a manufacturing element in the form of a container 227 attached to its corresponding platform 223. The container is configured to engage a corresponding standardized docking unit.

A fourth mobile manufacturing module 229 is shown disengaged with a removable positioning device 203 in proximity to the second and third modules 213, 215. The fourth mobile manufacturing module 229 comprises a manufacturing element in the form of a container 231 attached to the platform 232. The container is configured to engage the corresponding standardized docking unit.

The manufacturing elements 210, 225, 227 and 231 are interchangeable and attachable to each of the modules 201, 213, 215, 229 via an interface provided at each of the platforms 206. 221. 223. 232. This is advantageous in that it enables standardization of interfaces and enables retrofitting or adaptation of each module to provide a particular function in a manufacturing operation.

Each module 201, 213, 215, 229 further comprises a plurality of corresponding connectors 233 configured to engage one another one such that each module 201, 213, 215, 229 can be connected to one another such that traction forces or lifting forces can be transferred between a plurality of modules 201, 213, 215, 229. The connectors 233 permit a plurality of modules 211 to move as a single modular assembly when a connected and each mobile manufacturing module is simultaneously engaged with one or more removable positioning. They further allow one or more redundant module not required for or at a point in time during a particular manufacturing to be removed, thus increasing accessibility to the work area, and freeing up modules that can be used in other manufacturing operations.

One or more of the modules 201, 213, 215, 229 can furthermore be connected to at least control console 235 that may be interchangeable with a platform of a module or otherwise connect to and identify the manufacturing elements of one or more of the modules. The control console may comprise a hardware component and a software component, configured to enable controlled interactions between the manufacture elements of each of the modules, enabling interaction, collaboration or merging of functions between the modules.

An exemplary interaction may comprise autonomous loading or removal of fasteners from a particular module or a container attached to a particular module. Another exemplary interaction may comprise automated and intelligent module merging according to a prescribed set of tasks in one or manufacturing operations.

The control console 235 may provide an interface allowing a technician to pause a manufacturing operation or segments of a manufacturing operation, or to override a module merging decision. In such cases, the control console 235 may be further configured to compute and offer an alternative manufacturing operations solution in real-time. Inputs to the control console 235 may be provided using teach-in, direct instruction programming via an input device such as a keyboard or mouse, voice control, or gesture recognition.

Furthermore, one or more of the modules 201, 213, 215, 229 can furthermore be connected to at least an electrical power distributor, which may further provide direct or inductive charging for one or more modules and their respective manufacturing elements.

Figure 3:
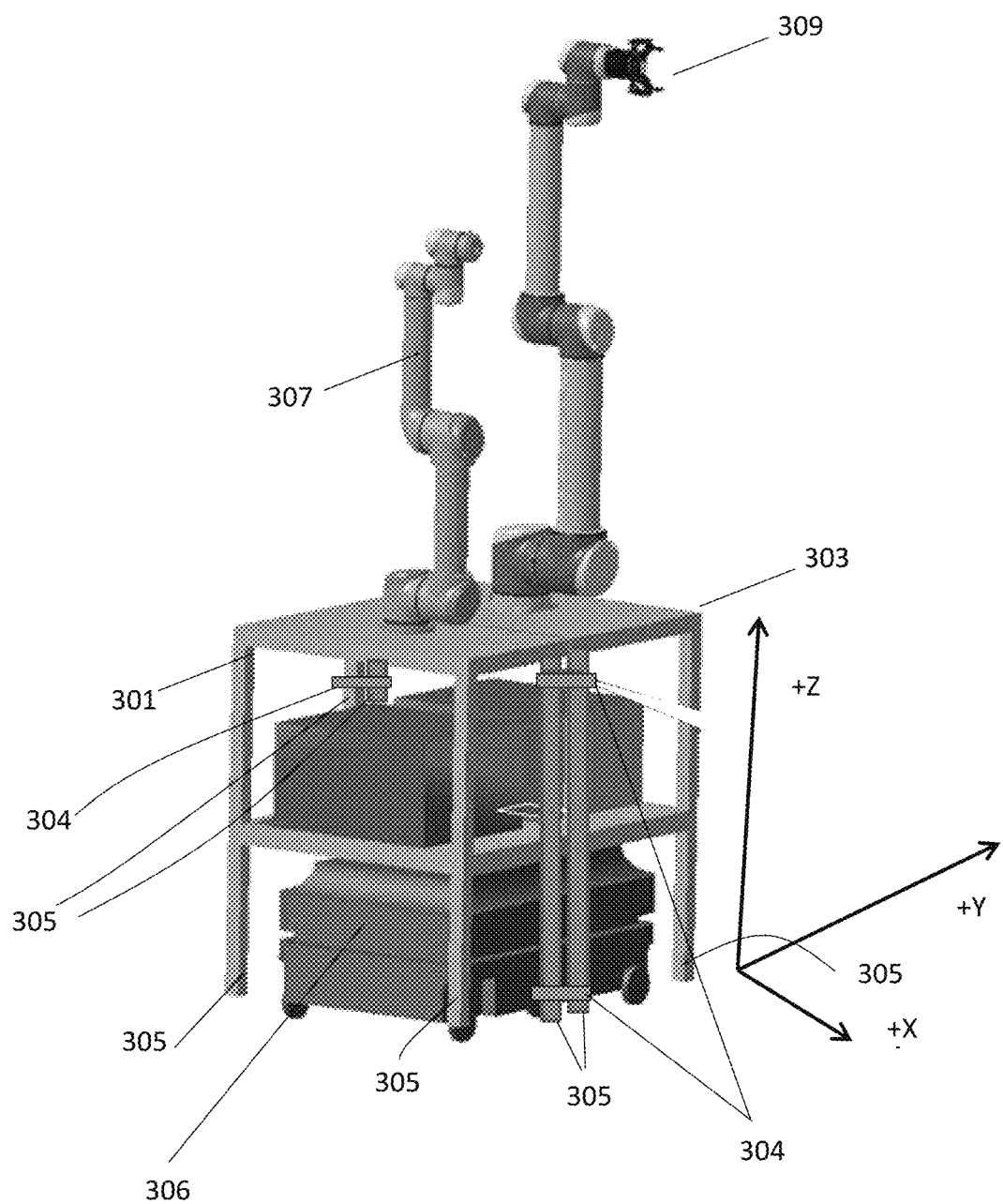
FIG. 3 shows an isometric perspective view of a plurality of mobile manufacturing modules according to a further embodiment of the present technology.

With reference to FIG. 3, a further embodiment of the technology is shown comprising pair of modules 301, 303 adjacent to each other and connected via set of 4 connectors 304 (2 per side) in accordance with the previous embodiment.

The first module 301 is interchangeably fitted with a first manipulator 307 that is smaller than a second manipulator 309 interchangeably fitted to a second module 303. A removable lifting device 306 with lifting means lifts both modules 301 303 in the +Z direction indicated such that contact is removed between the floor and the respective supports 305 and 305 of each module 301, 303, such that the modules may be repositioned to an assembly position adjacent to a wing work piece. The connectors 304 are stiff rods removably attached to the modules that in the present embodiment are configured to enable lifting forces (−+Z direction) and traction forces (in the XY plane) to be transmitted between the modules 301 303. Once in position the removable positioning device 306 with lifting means lowers both modules 301 303 in the Z direction indicated, then disengages the modules 301, 301 and repositions to another set of modules being used in separate operations.

Figure 4A:
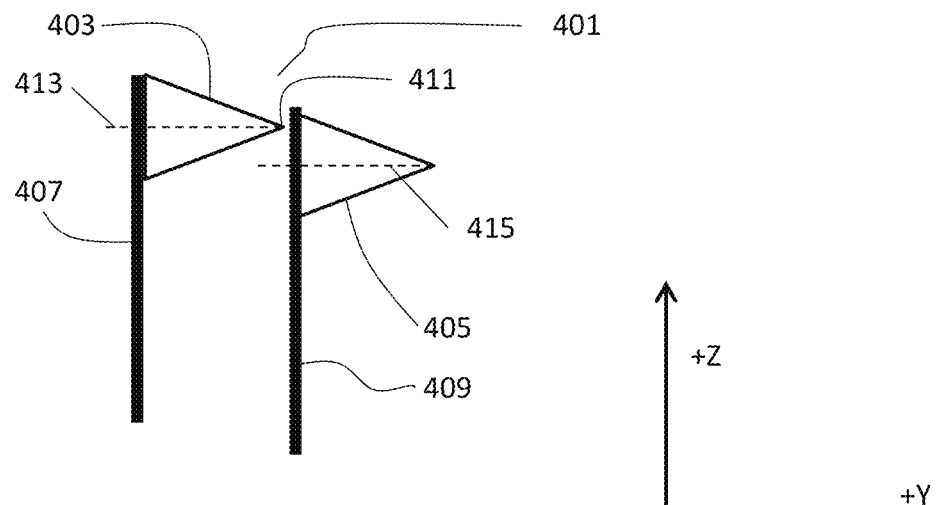
FIGS. 4A and 4B shows a schematic view of a connector for a plurality of mobile manufacturing modules in a pre-connected and connected state, respectively, according to an embodiment of the present technology.

With reference to FIG. 4A, a lifting connector 401 is shown in greater detail in a pre-connected state. The connector 401 comprises a male element 403 and a female element 405 that are correspondingly cone shaped elements. The male element 403 is fixedly attached to a support of a first module 407, and the female element 405 is fixedly attached to an adjacent support of a second module 409. In the pre-connected state, an end portion 411 centered on an axis 413 of the male element 403, is positioned above corresponding center axis 415 of the female element 405.

Figure 4B:
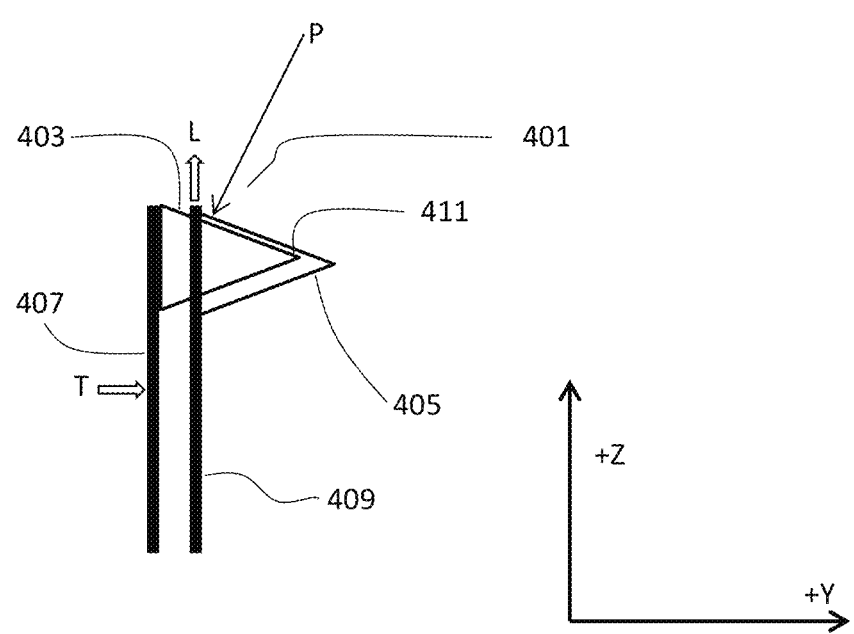

With reference to FIG. 4B, the lifting connector 401 of FIG. 4A is shown in greater detail in a connected state. During the connection, the first module 407 with the male element 403 is moved into contact at point P of the female element 405 of the second module 409. Further movement results in the end 411 of the male element 403 imparting a lifting load L in the positive Z direction on the female element 405 that lifts the second module 409 as the first module 407 is brought closer under a traction force T to the second module 409.

Figure 5:
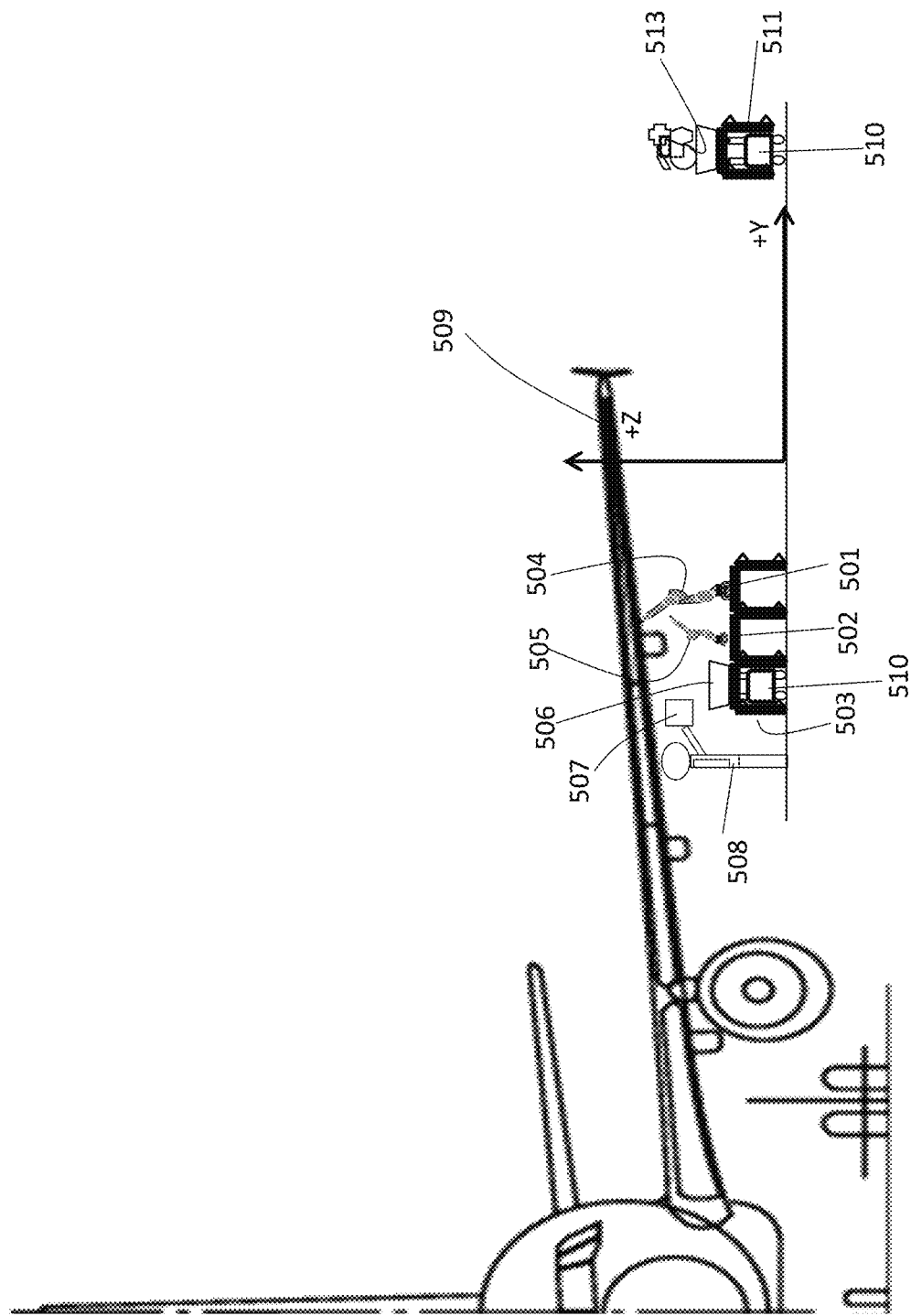
FIG. 5 shows a schematic view of a manufacturing line using a mobile manufacturing module and a plurality of mobile manufacturing modules according to a further embodiment of the present technology.

With reference to FIG. 5, a plurality of mobile manufacturing modules 501, 502, 503 are shown connected, interchangeably connected to a large manipulator 504, a small manipulator 505 and a container 506, respectively and interacting with a control console 507. The control console 507 is programmable via an interface with a technician 508 to enable the manipulators 504, 505 to interact collaboratively to perform operation steps in a manufacturing operation with one another, the container 506, and the technician 508. The manufacturing operations involves the technician 508 instructing the modules 501, 502, 503 to be positioned adjacent to a wing 509 which in this case is the work piece, in a manner the same as described in previously. Once in position the removable positioning device 510 disengages the modules 501, 502, 503 and repositions to another of module 511 being re-stocked by a standardized docking unit 513. While the technician 508 performs the manufacturing operation tasks, the manipulators 504, 505 assist by holding various structural elements such as raceways, holding panels, unscrew panels, positioning or screw raceways, in a desired position. The manipulators 504 505 interact, wherein for example the large manipulator 504 carries tools or materials required by the technician 508, while the smaller manipulator 505 supports for navigation or controlling the task (i.e., by monitoring manufacturing steps using a manufacturing element that comprises a camera, scanner, or other sensors, or by pushing a tool trigger button. The smaller manipulator 505 may also assist by also holding materials or tools for the technician.

Figure 6:
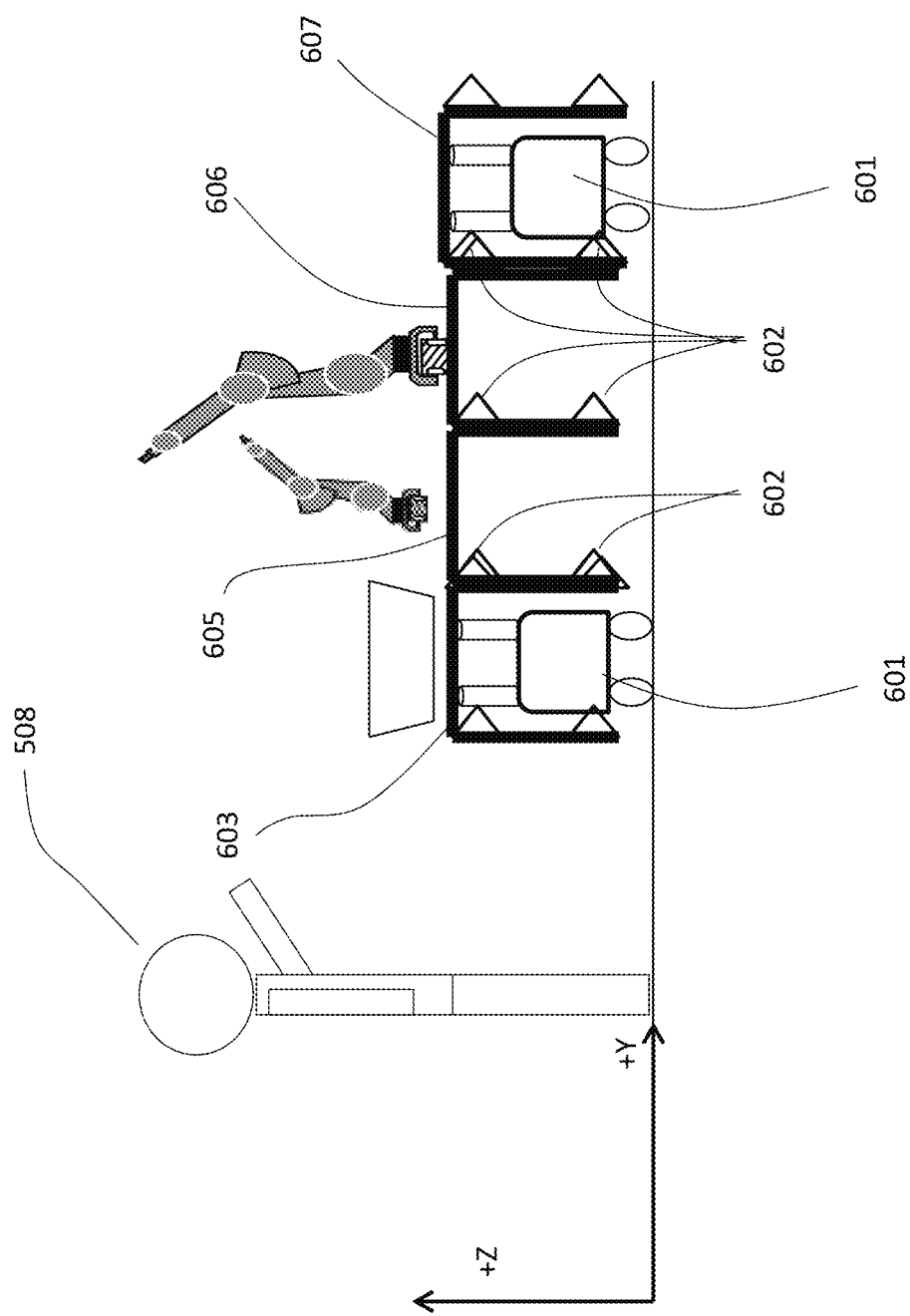
FIG. 6 shows a schematic view of a manufacturing line using a mobile manufacturing module and a plurality of mobile manufacturing modules according to yet a further embodiment of the present technology.

With reference to FIG. 6, it should be considered that a pair of removable positioning devices 601 may be used to move a plurality of mobile manufacturing modules 603, 605, 606, 607 connected to one another by connectors 602. The pair of removable positioning devices 601 may engage a corresponding pair of modules 603 and 607 as shown and be used in to pull and to push the plurality of connected mobile manufacturing modules 603, 605, 606, 607. This may be advantageous where the weight of the modules is close to exceeding the traction capability of single removable positioning devices 601.

In the present embodiment the connectors 602 are configured to transmit traction as well as lifting forces between adjacent modules 603, 605, 606, 607, such that when lifting means is engaged at the end modules 603 and 607 by their corresponding removable positioning devices 601, each adjacent mobile manufacturing module 605 and 607 does not contact the floor. When the corresponding removable positioning devices 601 then move, the traction forces are transferred between the connectors 602 such that the plurality of modules move as a single modular assembly. Alternatively, the middle modules 605, 606 may comprise supports, the length of which may be adjustable such that contact with the floor can be removed once the platform is lifted sufficiently to remove load from supports when the removable positioning device 601 is engaged.

The pair of removable positioning devices 601 may interact to provide a more accurate and failsafe positioning system. Additionally, the removable positioning devices 601 may interact as master/slave combination or in flexible guidance (depending of moving direction).

Figure 7:
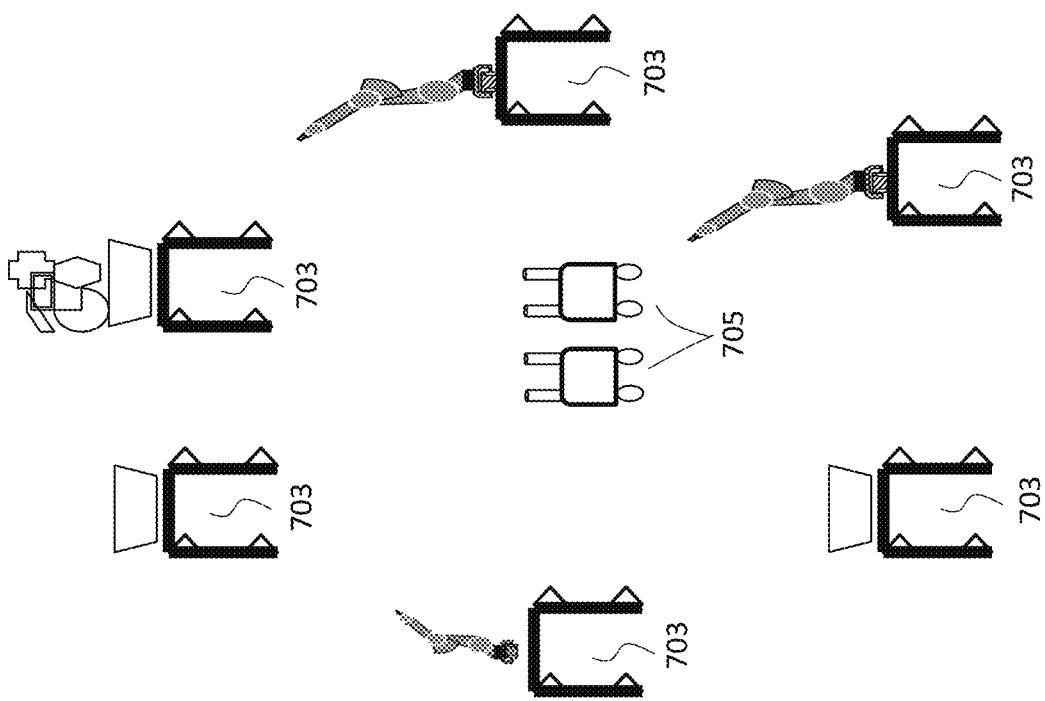
FIG. 7 shows a system of mobile manufacturing modules according to another embodiment of the present technology.

With reference to FIG. 7, a system 701 is shown wherein individual modules 703, substantially in accordance to those previously described, may be moved by one or more removable positioning devices 705 with functional autonomy such that the modules 703 may self-organize to carry out a series of manufacturing operations. The modules as described are provided with interaction means via a control console or any other suitable alternative, such that the interactions are autonomous without requiring inputs from a technician and self-optimizing according to the required manufacturing operation.

Wherein the foregoing description, integers or members are mentioned which have known, obvious or foreseeable equivalents; then such equivalents are herein incorporated as if individually set forth. By way of example it should be appreciated that, while the exemplary embodiments above have been given for a work piece that is an aircraft wing, the modules may be used to carry out similar manufacturing operations to any other aircraft component such as a tail unit, fuselage, powerplant or pylon or landing gear element. It should further be appreciated that it is application internal and external to any aircraft structure or space structure.

Reference should be made to the claims for determining the true scope of the present technology, which should be construed so as to encompass any such equivalents. It will also be appreciated by the reader that integers or features of the technology that are described as preferable, advantageous, convenient or the like are optional and do not limit the scope of the independent claims. Moreover, it is to be understood that such optional integers or features, whilst of possible benefit in some embodiments of the technology, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A mobile manufacturing module system comprising:
   a first horizontal platform including vertical support sides with one of said side supports having exterior connectors and a second side support having a receiving connector and a robotic manipulator arm which is removably connected with the first horizontal platform; and
   a lifting unit including wheels, the lifting unit for moving the first horizontal platform and vertical support sides wherein the first horizontal platform is moveable and lockable by lifting unit within the first horizontal platform.

2. The mobile manufacturing module system according to claim 1, wherein the lifting unit is further configured to generate traction forces such that the module system can be driven by the lifting unit.

3. The mobile manufacturing platform system according to claim 1, wherein the lifting unit comprises lifting means configured to engage the first horizontal platform and to lift the first horizontal platform, such that contact between the floor and the supports is removed.

4. The mobile manufacturing module system according to claim 1, wherein the first horizontal platform comprises a container.

5. The mobile manufacturing module system according to claim 1, wherein the first horizontal platform comprises a control console.

6. The mobile manufacturing module system according to claim 1, wherein the first horizontal platform comprises an electrical power distributor.

7. The mobile manufacturing module system according to claim 1 further comprising:
   a second horizontal platform including vertical support sides and one of said side supports having exterior connectors and a second side support having a receiving connector; and
   a second lifting unit including wheels, the second lifting unit for moving the second horizontal platform and side supports wherein the second horizontal platform is moveable and lockable by lifting unit within the second horizontal platform.

8. The mobile manufacturing module system according to claim 7, wherein the exterior connectors on the first horizontal platform and the second horizontal platform are configured to connect the first horizontal platform and the second horizontal platform to one another and further configured to transfer traction forces between the first horizontal platform and the second horizontal platform such that they may move as a single modular assembly when the first horizontal platform and the second horizontal platform are simultaneously engaged with the lifting unit and the second lifting unit, respectively.

9. The mobile manufacturing module system according to claim 7, the external connectors configured to transfer lift forces between the first horizontal platform and the second horizontal platform.

10. The mobile manufacturing module system according to claim 7, wherein the second horizontal platform comprises a robotic manipulator configured to work in tandem with the robotic manipulator on the first horizontal platform to carry out a series of manufacturing operations.

11. The mobile manufacturing module system according to claim 1, configured for use on an aircraft manufacturing line.

12. The mobile manufacturing module system according to claim 7, configured for use on an aircraft manufacturing line.

13. The mobile manufacturing module system according to claim 7, wherein the second horizontal platform comprises a container removably connected to the second horizontal support.

* * * * *